(12) United States Patent
Guttman et al.

(10) Patent No.: US 10,979,600 B2
(45) Date of Patent: Apr. 13, 2021

(54) METHOD AND PRINTER SYSTEM FOR DETERMINING ADJUSTED OUTPUT SETTINGS

(71) Applicant: HP Indigo B.V., Amstelveen (NL)

(72) Inventors: Nir Guttman, Ness Ziona (IL); Gregory Braverman, Ness Ziona (IL); Dan Ben Yaakov, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/632,424

(22) PCT Filed: Sep. 5, 2017

(86) PCT No.: PCT/EP2017/072266
§ 371 (c)(1),
(2) Date: Jan. 20, 2020

(87) PCT Pub. No.: WO2019/048029
PCT Pub. Date: Mar. 14, 2019

(65) Prior Publication Data
US 2020/0228682 A1 Jul. 16, 2020

(51) Int. Cl.
*H04N 1/60* (2006.01)
(52) U.S. Cl.
CPC ........... *H04N 1/6047* (2013.01); *H04N 1/605* (2013.01); *H04N 1/6008* (2013.01)
(58) Field of Classification Search
None
See application file for complete search history.

(56) References Cited

U.S. PATENT DOCUMENTS

| 5,416,613 | A | 5/1995 | Rolleston et al. |
| 7,239,402 | B2 | 7/2007 | Soler et al. |
| 7,738,140 | B2 | 6/2010 | Hancock et al. |
| 7,952,757 | B2* | 5/2011 | Kaneko ............... H04N 1/6033 358/1.9 |

(Continued)

FOREIGN PATENT DOCUMENTS

EP 2651112 10/2013

OTHER PUBLICATIONS

Fuji Xerox, "How to Adjust a Spot Color. Gx Print Server", 2017 <http://m1-onlinesupport.fujixerox.com/driver_downloads/HTD/HTD_how_to_adjust_spot_colors-gxprintserver.pdf >.

*Primary Examiner* — Anh-Vinh T Nguyen
(74) *Attorney, Agent, or Firm* — Brooks Cameron & Huebsch PLLC (57) ABSTRACT

A method of printing comprises executing an output settings calibration procedure, the procedure comprising: depositing, by one or more printing elements, ink onto a first substrate according to respective output settings. The procedure further comprises measuring, by a sensor, an actual color value of the ink deposited onto the first substrate at each of a plurality of locations. The procedure further comprises determining a difference between the actual color value and a target color value for each of the plurality of locations and determining adjusted respective output settings for each of the plurality of locations based on the determined difference. The method further comprises depositing, by the one or more printing elements, ink onto a second substrate according to the adjusted respective output settings.

15 Claims, 9 Drawing Sheets

(56) References Cited

U.S. PATENT DOCUMENTS

| | | | |
|---|---|---|---|
| 8,040,563 B2* | 10/2011 | Maki | H04N 1/6072 358/1.9 |
| 8,072,646 B2 | 12/2011 | Mestha et al. | |
| 8,194,980 B2* | 6/2012 | Sakurai | H04N 1/6016 382/167 |
| 8,705,119 B2 | 4/2014 | Bonikowski et al. | |
| 8,743,421 B1 | 6/2014 | Ross, Jr. et al. | |
| 8,869,696 B2* | 10/2014 | Sugiyama | H04N 1/6011 101/211 |
| 8,882,228 B2* | 11/2014 | Ojiro | B41J 2/2114 347/15 |
| 9,565,339 B2 | 2/2017 | Noffke et al. | |
| 10,042,277 B2* | 8/2018 | Bar-Haim | G03G 9/122 |
| 2003/0025924 A1* | 2/2003 | Lammens | H04N 1/6022 358/1.9 |
| 2003/0202192 A1* | 10/2003 | Kuwata | H04N 1/4015 358/1.9 |
| 2004/0042022 A1* | 3/2004 | Friedman | B41F 33/0045 358/1.9 |
| 2005/0052666 A1* | 3/2005 | Yamamoto | H04N 1/54 358/1.9 |
| 2005/0094169 A1* | 5/2005 | Berns | H04N 1/6033 358/1.9 |
| 2005/0134872 A1* | 6/2005 | Maki | B41F 33/0036 358/1.6 |
| 2005/0190389 A1* | 9/2005 | Tanaka | H04N 1/6033 358/1.9 |
| 2005/0200868 A1* | 9/2005 | Yoshida | H04N 1/6077 358/1.9 |
| 2005/0206927 A1* | 9/2005 | Yamada | H04N 1/56 358/1.9 |
| 2005/0219569 A1* | 10/2005 | Yamamoto | H04N 1/6097 358/1.9 |
| 2005/0219588 A1* | 10/2005 | Yoshida | H04N 1/6033 358/1.9 |
| 2005/0280848 A1* | 12/2005 | Seko | H04N 1/6058 358/1.9 |
| 2007/0030505 A1* | 2/2007 | Ito | H04N 1/6033 358/1.9 |
| 2008/0018918 A1* | 1/2008 | Ozaki | B41F 33/0045 358/1.9 |
| 2008/0216695 A1* | 9/2008 | Ozaki | B41F 33/0045 101/484 |
| 2010/0245867 A1* | 9/2010 | Murata | H04N 1/603 358/1.9 |
| 2011/0001993 A1* | 1/2011 | Kato | H04N 1/6025 358/1.9 |
| 2011/0075171 A1* | 3/2011 | Hoshii | H04N 1/00034 358/1.9 |
| 2011/0090520 A1* | 4/2011 | Yokoi | H04N 1/6019 358/1.9 |
| 2011/0279832 A1* | 11/2011 | Muro | H04N 1/6033 358/1.9 |
| 2012/0105878 A1* | 5/2012 | Aharon | H04N 1/605 358/1.9 |
| 2012/0224199 A1* | 9/2012 | Fukuda | H04N 1/6097 358/1.9 |
| 2012/0243011 A1* | 9/2012 | Fukuda | G06F 15/00 358/1.9 |
| 2013/0250322 A1* | 9/2013 | Kawabata | H04N 1/6055 358/1.9 |
| 2016/0182764 A1* | 6/2016 | Akasaka | G06K 15/02 358/1.9 |
| 2017/0085726 A1 | 3/2017 | Tominaga et al. | |

\* cited by examiner

METHOD AND PRINTER SYSTEM FOR DETERMINING ADJUSTED OUTPUT SETTINGS

BACKGROUND

Printer systems are arranged to print printing fluid, such as ink, on to substrates to form images. An example printer system may print images using a combination of colored inks. When printing an image, the printer system may be controlled to print different colors using particular combinations of the colored inks so as to represent the color in the image when printed on the substrate. For example, a printer system may print a color image using a combination of cyan, magenta, yellow and black inks.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

As described herein, an example printer system comprises a controller, memory, one or more printing elements and a sensor. The memory is configured to store respective output settings for a plurality of locations on a substrate. The one or more printing elements are configured to deposit ink onto the substrate and the sensor is configured to measure actual color values of the ink deposited onto the substrate. A printer system may also be known as a printer device.

Due to an imperfect printing process, colors printed onto a substrate can appear differently depending upon where the color is printed on the substrate. For example, if a single color is to be printed across the whole of the substrate, the color can be non-uniform in nature once actually printed. In an example, if a blue color is printed across the whole substrate, the color may appear darker on one side of the substrate, too green on the other side of the substrate, and too magenta towards the center.

The example printer systems described herein can adapt how the ink is applied to the substrate depending upon where the ink is applied on the substrate. It has been found that non-uniform colors can occur for several reasons. For example, uneven surfaces within the printer system, such as a non-uniform drum, transfer member or belt, can result in more or less ink being applied to the surface, and subsequently the substrate. In another example, the optical intensity of a laser used to dissipate charge on a photo imaging plate (PIP) can vary at different locations on the PIP, as a result of non-uniform optical components, such as lenses or mirrors. Where these factors contribute to non-uniform colors, they may occur at the same position on each substrate. For example, an uneven drum may change the appearance of colors in the same location in each printed image.

In one example, a printer system comprises four printing elements; one to deposit cyan (C) ink, one to deposit magenta (M) ink, one to deposit yellow (Y) ink, and one to deposit black (K) ink, onto a substrate. The combination of these four colors, can print color images. Each printing element is associated with an output setting, which defines a coverage value for the ink to be deposited by that printing element. For example, the "martini olive" color can be represented by the following four CMYK coverage values: [15, 0, 57, 36]. Hence to print ink onto a substrate according to the "martini olive" color, the output setting for the cyan printing element is 15%, the output setting for the magenta printing element is 0%, the output setting for the yellow printing element is 57% and the output setting for the black printing element is 36%.

Continuing with the example above, if the martini olive color is to be printed across a whole substrate, the output settings for the printing elements may initially be set as [15, 0, 57, 36] for the whole substrate (i.e. for every location on the substrate). However, due to the imperfect printing effects described above, once actually printed, the martini olive color may not appear the same at different locations on the substrate. This is visible as a non-uniform color across the substrate and may reduce the perceived quality of the printed image. To compensate for this unwanted effect, an example printer system can set the output settings differently depending upon where the ink is being deposited on the substrate. For example, if at one location on the substrate the actual color of the ink appears too black, the output settings for that location may be adjusted to [15, 0, 57, 34], to reduce the black component. In another location, the actual color of the ink may appear too black and too yellow, so the output settings for that location may be adjusted to [15, 0, 55, 34]. In other locations, the actual color of the ink may appear as expected, so no adjustments are to be made. It will be appreciated that although whole integer adjustments are shown in this example, adjustments may be a fraction of an integer in other examples. For example, an adjustment may be expressed as 8-bit number representing a fractional adjustment, giving a fractional adjustment of n/255 in that case. In other examples an integer adjustment and a fractional adjustment may be provided. Hence, adjusted output settings can be determined by comparing the actual color printed with a target color, where the target color is the wanted color. Output settings for the printing elements may be defined for each of a plurality of locations, and may therefore be referred to as respective output settings. Adjustments to these respective output settings are similarly defined for the plurality of locations, and may therefore be referred to as adjusted respective output settings. In other words, the output settings for one location on the substrate may be different from the output settings at another location, so that the same target color is printed with different output settings at different locations on the substrate.

Example printer systems described herein are thus configured to determine adjusted respective output settings, such as CMYK coverage values, for a plurality of locations on a substrate, such that the ink on the substrate more closely matches the target colors across the whole substrate.

An example method of printing comprises executing an output settings calibration procedure, the procedure comprising depositing, by one or more printing elements, ink onto a first substrate according to respective output settings. For example, the respective output settings for any given color may initially be the same regardless of the location on the substrate where the color is to be printed. An initial "test" image is printed. This test image may be the desired image to be printed, or it may be an abstracted version of the desired image. For example, the abstracted version may include patches of colors printed at a plurality of locations, where a patch of color corresponds to a color located at that particular location within the image.

Regardless of what is initially printed, the procedure further comprises measuring, by a sensor, an actual color value of the ink deposited onto the first substrate at each of a plurality of locations. This measurement provides a way of quantifying the color values that were actually printed onto the substrate at the different locations. In one example, the sensor measures the colors and quantifies the colors according to L*a*b* values within the Lab color space. Other examples may use other color spaces. A L*a*b* value describes a color in three dimensions according to the Lab color space. A L*a*b* value may represent a spot color. The procedure further comprises determining a difference between the actual color value and a target color value for each of the plurality of locations. A target color value represents the color that was intended to be printed. In one example, the target color value is also defined according to a L*a*b* value. The procedure may further comprise determining adjusted respective output settings for each of the plurality of locations based on the determined difference. For example, as described above, adjustments to the output settings may be made to compensate for the differences between the target color value and the actual color value that was printed at each of the locations. Once these correction adjustments have been made, the method may further comprise depositing, by the one or more printing elements, ink onto a second substrate according to the adjusted respective output settings. This may result in an image in which the printed colors more closely match the target colors across the whole surface of the substrate.

Figure 1:
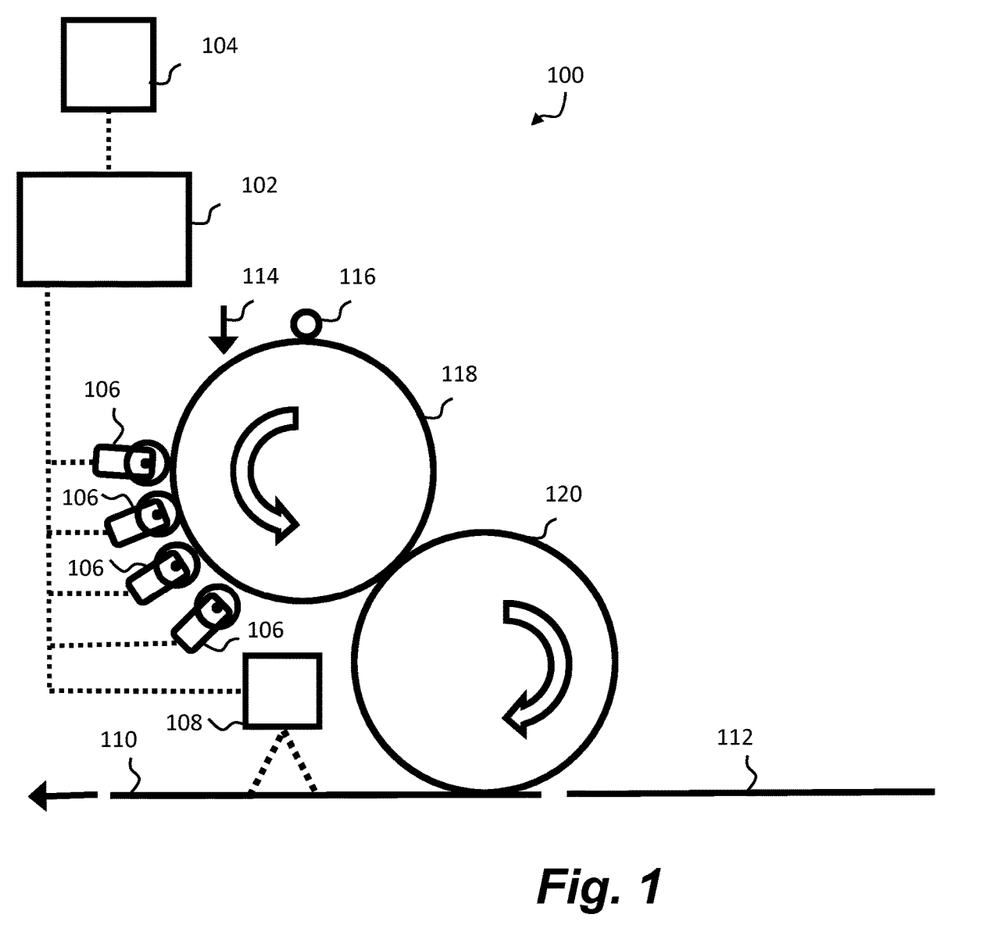
FIG. 1 is a schematic diagram showing a printer system in accordance with an example.

FIG. 1 is a schematic diagram showing a printer system 100 in accordance with an example. The printer system 100 comprises a controller 102, which can control elements within the printer system 100. The controller may comprise one or more processors for example. The printer system 100 may further comprise memory 104, configured to store respective output settings for a plurality of locations on a substrate. The memory 104 may be a non-transitory computer-readable storage medium and in some examples may be part of the controller 102. The printer system 100 may further comprise one or more printing elements 106 configured to deposit ink onto the substrate. In the example of FIG. 1, the printer system comprises four printing elements 106, however it will be appreciated that the printer system 100 may comprise any number of printing elements 106 as needs dictate. The printer system 100 of FIG. 1 further comprises a sensor 108, configured to measure actual color values of the ink deposited onto the substrate, however it will be appreciated that the sensor 108 may be separate from the printer system 100, but communicatively coupled to the printer system 100. The memory 104, the one or more printing elements 106 and the sensor 108 may be connected directly or indirectly to the controller 102 via one or more communication paths, shown depicted as dashed lines, to allow the transmission of data between the controller 102, the memory 104, the one or more printing elements 106 and the sensor 108.

The controller 102 may also be in data communication with other elements of the printer system 100, such as an imaging unit 114, a photo charging unit 116, a photo imaging plate (PIP) 118 and a transfer element 120, however these communication paths are omitted for simplicity. Briefly, the photo charging unit 116, such as a corona wire, can deposit static charge onto the PIP 118. As the PIP 118 rotates, it passes under the imaging unit 114 where charge is dissipated in selected portions of the PIP 118 to leave an invisible electrostatic charge pattern that corresponds to the image to be printed. In an example, the imaging unit 114 comprises one or more lasers. Ink is then transferred to the PIP 118 by at least one of the printing elements 106. The layers of ink from each of the printing elements 106 can then be transferred to the transfer element 120, either individually or together, before being deposited onto the substrate 110 to form the image.

Figure 2:
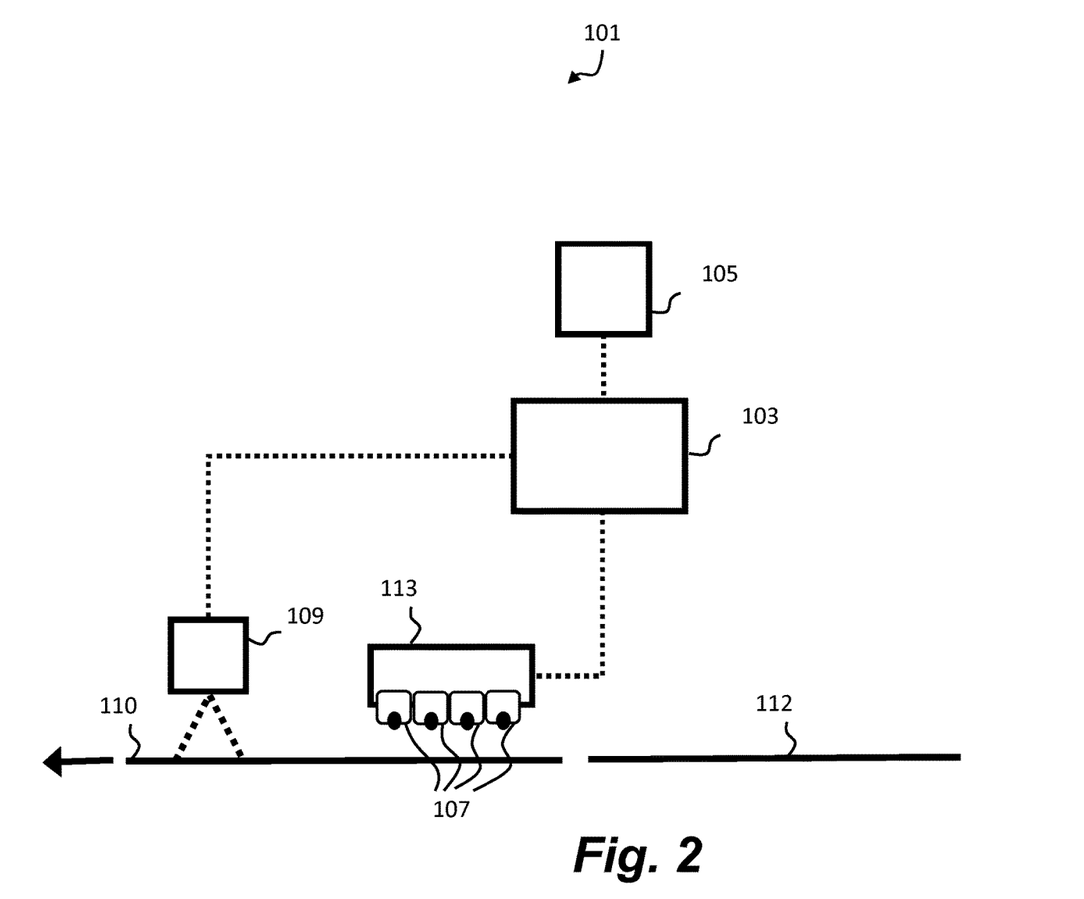
FIG. 2 is a schematic diagram showing an alternative printer system in accordance with an example.

FIG. 2 is a schematic diagram showing an alternative printer system 101 in accordance with a second example. The printer system 101 may be an inkjet printer, for example. The printer system 101 comprises a controller 103, memory 105, and a sensor 109 that may be substantially the same, and operate substantially the same, as those shown in FIG. 1. The printer system 101 may further comprise one or more printing elements 107 configured to deposit ink onto the substrate 110. In the example of FIG. 2, the printer system comprises four printing elements 107, however it will be appreciated that the printer system 101 may comprise any number of printing elements 107 as needs dictate. The printing elements 107 may be located on one or more print heads 113. The memory 105, the one or more printing elements 107 and the sensor 108 may be connected directly or indirectly to the controller 103 via one or more communication paths, shown depicted as dashed lines, to allow the transmission of data between the controller 103, the memory 105, the one or more printing elements 107 and the sensor 109. The controller 103 may also be in data communication with other elements of the printer system (not shown). The one or more printing elements 107 can deposit ink directly onto the substrate 110 to create an image on the substrate 110.

Figure 3:
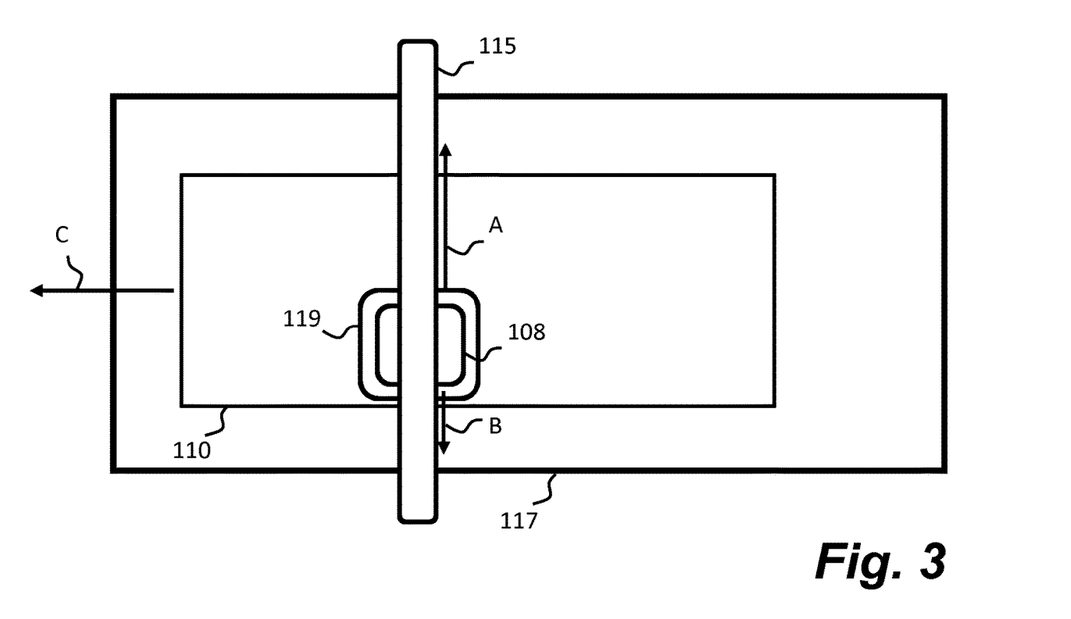
FIG. 3 is a schematic diagram showing a top down view of an image sensing portion of a printer system in accordance with an example.

FIG. 3 depicts a top down view of an image sensing portion of the printer system 100, 101. In this example, the sensor 108 is connected to an arm 115 and the sensor 108 can move along the arm in the directions indicated by arrows A and B. As the substrate 110 is moved in the direction of the arrow C by a conveyor belt 117, the sensor 108 can measure actual color values of ink deposited onto the substrate 110 at a plurality of locations. In another example, the arm 115 can also move in directions along the substrate which are perpendicular to the directions indicated by arrows A and B, for example in the direction of arrow C. The boundary 119 depicts the field of view 119 of the sensor 108. In some examples, the field of view is configurable by adjusting a setting of the sensor 108 or by adjusting a position of the sensor 108. In one example, the field of view 119 relates to a resolution of the sensor 108. The sensor 108 can measure an actual color value of the ink within an area defined by the field of view 119. The field of view 119 may have dimensions of the order of square millimetres or square centimetres in some examples. For example, the field of view 119 may have a dimension in the direction of arrow C of at least 1 mm, at least 5 mm, at least 10 mm, at least 15 mm or at least 20 mm. Similarly, the field of view 119 may have a dimension in the direction of arrow A of at least 1 mm, at least 5 mm, at least 10 mm, at least 15 mm or at least 20 mm. The dimensions in the direction of arrow C and the direction of arrow A may be different in some examples.

Figure 4:
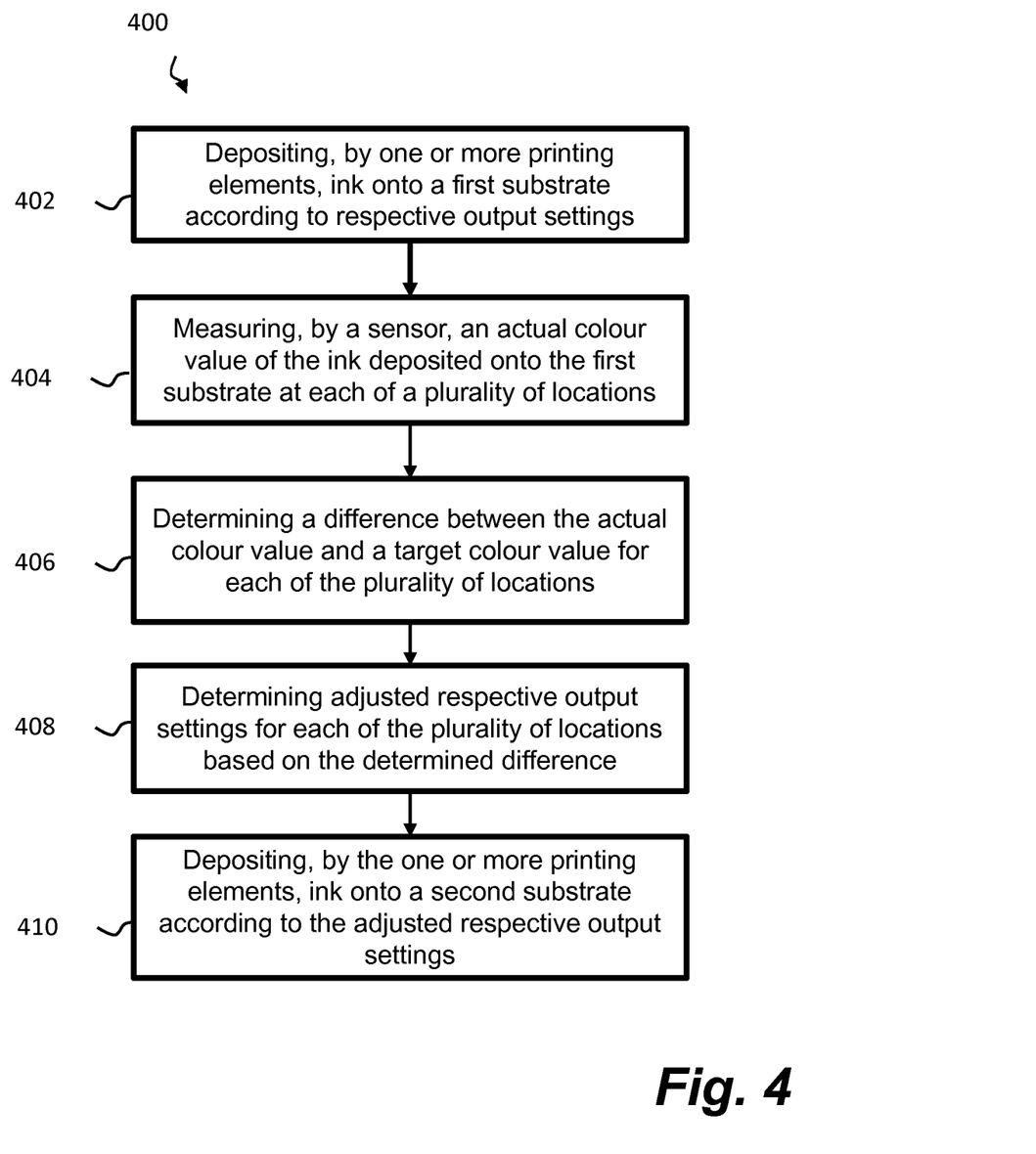
FIG. 4 is a flow diagram showing a method in accordance with an example.

FIG. 4 depicts a flow diagram showing an example method 400. The method can be performed by the example printer systems 100, 101 discussed in relation to FIGS. 1 and 2. Blocks 402-408 relate to an output settings calibration procedure. Block 410 relates to a printing procedure performed after the calibration procedure has been executed.

At block 402, the method comprises depositing, by one or more printing elements 106, 107, ink onto a first substrate 110 according to respective output settings. For example, the controller 102, 103 may be configured to instruct the one or more printing elements 106, 107 to deposit ink onto the first substrate 110 according to the respective output settings stored in the memory 104, 105. Output settings may relate to coverage values for each of the printing elements 106, 107, for example.

At block 404, the method comprises measuring, by the sensor 108, 109, an actual color value of the ink deposited onto the first substrate 110 at each of a plurality of locations. For example, the controller 102, 103 may be configured to instruct the sensor 108, 109 to measure an actual color value of the ink deposited onto the first substrate 110 at each of a plurality of locations. The sensor 110 may be a spectrophotometer (SPM), a colorimeter, or any other device capable of measuring color. In the example of FIGS. 1, 2 and 3, the sensor 110 is an SPM and is capable of measuring and defining colors according to their L*a*b* values within the Lab color space.

At block 406 the method comprises determining a difference between the actual color value and a target color value for each of the plurality of locations. For example, this may be performed by the controller 102, 103.

At block 408, the method comprises determining adjusted respective output settings for each of the plurality of locations based on the determined difference. For example, this may be performed by the controller 102, 103. In addition, the controller 102, 103 may be configured to store the adjusted respective output settings in the memory 104, 105 as the respective output settings.

At block 410, the method comprises depositing, by the one or more printing elements 106, 107, ink onto a second substrate 112 according to the adjusted respective output settings. For example, the controller 102, 103 may be configured to instruct the one or more printing elements 106, 107 to deposit ink onto the second substrate 110 at the plurality of locations according to the adjusted respective output settings stored in the memory 104, 105.

As can be seen in the example of FIG. 1, the instruction to deposit ink onto the first and second substrates 110, 112 includes instructing the one or more printing elements 106 to deposit ink onto the first and second substrates 110, 112 by indirect means, for example by depositing ink on to the surface of the PIP 118. In the example of FIG. 2, the ink will be deposited directly onto the first or second substrates 110, 112.

Several blocks within method 400 will now be described in more detail.

Block 404 comprises the sensor 108, 109 measuring, obtaining, or recording sensor data. The sensor 108, 109 thus measures the colors deposited onto the substrate 110 at different locations, and in doing so generates sensor data, which may be stored in memory 104, 105 and may be processed by the controller 102, 103.

Once the controller 102, 103 has received sensor data from the sensor 110 or memory 104, 105, the controller 102, 103 may be configured to determine a difference between the actual color values measured by the sensor 108, 109 and target color values for each of the plurality of locations, according to block 406. In one example, target color values and actual color values are colors defined in a color space. For example, in the Lab color space, the target color values and the actual color values are L*a*b* values which correspond to spot colors. The sensor 108, 109 may measure the actual color values as L*a*b* values, for example. In such an example, a difference between an actual color value $(L_1^*a_1^*b_1^*)$ and a target color value $(L_2^*a_2^*b_2^*)$ may be determined or calculated using the following formula:

$$dE = \sqrt{(L_1 - L_2)^2 + (a_1 - a_2)^2 + (b_1 - b_2)^2} \quad (1)$$

Where dE represents the difference between two color values as a Euclidian distance in the Lab color space.

These differences can be determined for each location measured by the sensor 108, 109. Once these differences have been determined for each location, the controller 102, 103 may determine adjusted respective output settings for each of the plurality of locations based on the determined differences in block 408. This then ends an output settings calibration procedure.

As mentioned, after the calibration procedure, the controller 102, 103 may further be configured to instruct the one or more printing elements 106, 107 to deposit ink onto a second substrate 112 at the plurality of locations according to the adjusted respective output settings. A single run of the output settings calibration procedure may accurately adjust the respective output settings to compensate for the location based variations. However, this may not always be the case and further adjustments may be performed. The method 400, can therefore be repeated, or be iterated, a number of times until a difference, determined in block 408, for at least one of the plurality of locations, falls below a threshold difference. For example, the procedure may be repeated until the difference, dE, is below a threshold for a 90% of the locations, below a threshold for 75% of the locations, or below a threshold for 50% of the locations. Hence, a number of iterations can be performed until the printed image on the substrate more closely matches the desired image and the colors appear consistent across the substrate. In one example, the threshold in terms of dE is 0.5, 1, 1.5 or 2. In other words, blocks 402-408 may be repeated until the determined difference for at least one of the plurality of locations is below a threshold difference.

Figure 5A:
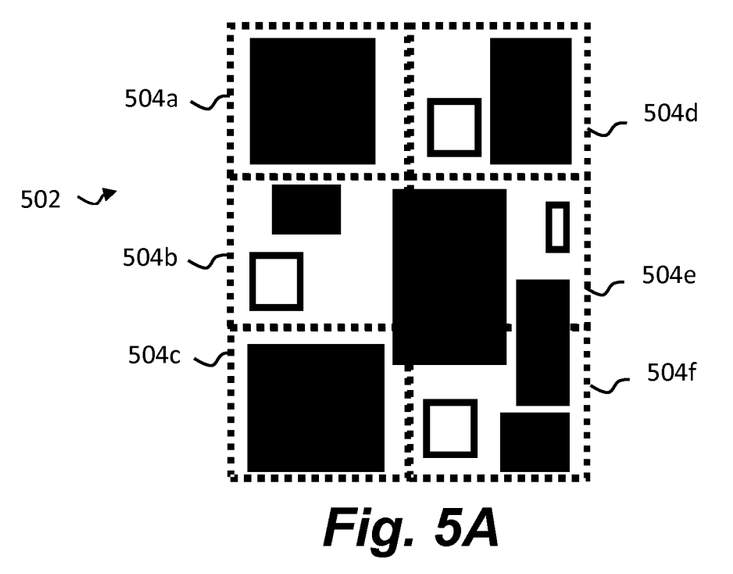
FIG. 5A is a diagram showing an example image to be printed onto a substrate in accordance with an example.

As described above, block 402 of the output settings calibration procedure comprises depositing, by the one or more printing elements 106, 107, ink onto a first substrate 110 according to initial respective output settings. These initial respective output settings (such as CMYK values) are related to the color that is to be printed at each location on the substrate. FIG. 5A depicts an example image 502 to be printed. In this example, the image is particularly complex in nature. In this example, the image comprises two colors, represented by black and white, and each color is defined by a different target color value. In other examples, there may be one, two or more colours in an image. The image may be represented by image data and may be received by the printer system 100, 101 from a computing device (not shown) communicatively coupled to the printer system 100, 101. The image 502 can be printed onto a substrate.

When the sensor 108, 109 measures the actual color values of the ink deposited onto the substrate 110 at different locations, the sensor data for a particular location measurement could be indicative of more than one color. For example, an area on the substrate 110 defined by the field of view 119 of the sensor 108, 109 may comprise more than one color. Hence the sensor data may be a combination of two of more colors, and a comparison to a target color could result in an incorrect color difference dE being determined. Accordingly, to ensure that the sensor 108, 109 measures a single color at each location, the substrate 110 being measured may comprise a single color in the field of view 119 of the sensor 108, 109 at each location. For high resolution sensors (i.e. sensors with a relatively small field of view 119), this may already be the case. Similarly, relatively simple images may already comprise only one colour in the field of view 119 of the sensor 108, 109 when measured at each location. For more complex images, or for low resolution sensors 108, 109 with a relatively large field of view 119, more than one color may be present in an area defined by the field of view 119 of the sensor 108, 109. To ensure the respective output settings are adjusted correctly, the "test image" initially printed onto the first substrate 110 in block 402, may need to be an abstracted version of the actual image being printed. This abstracted image would comprise a single color in an area defined by the field of view 119 of the sensor 108, 109. Therefore, any image being printed initially needs to be analysed, and an abstracted image may be created based on the image, based on the analysis.

Figure 6:
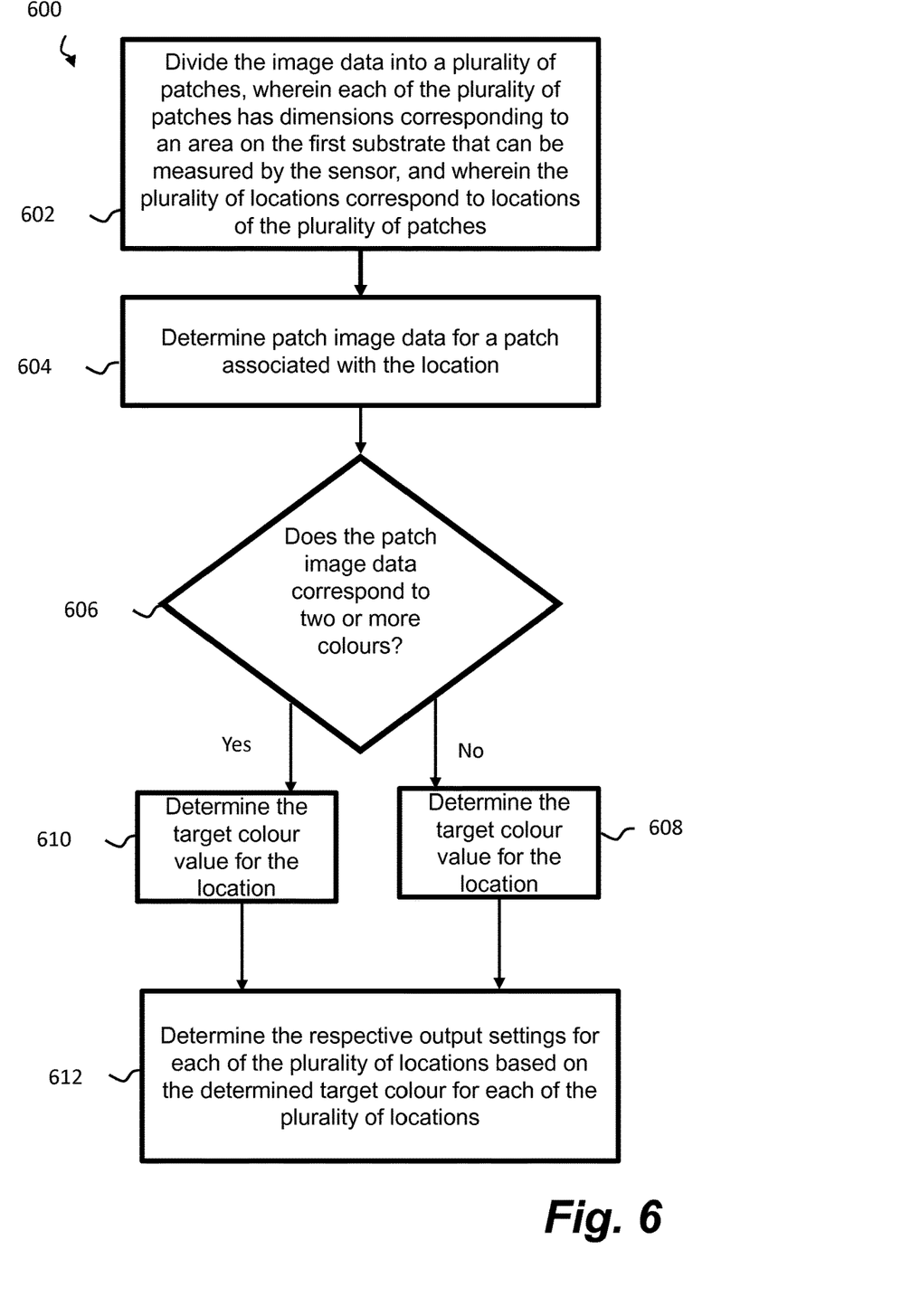
FIG. 6 is a flow diagram showing a method in accordance with an example.

FIG. 6 depicts a flow diagram showing a method 600. The method can be performed by the example printer systems 100, 101 discussed in relation to FIGS. 1 and 2. The method 600 describes determining whether the image itself is to be printed onto the first substrate 110, or whether an abstracted version of the image is to be printed, and if the abstracted image is to be printed, what colors are printed at each of the plurality of locations. Method 600 may be performed as part of block 402, of method 400, for example.

At block 602, the method comprises dividing the image data into a plurality of patches, areas or regions, wherein each of the plurality of patches has dimensions corresponding to an area on the first substrate 110 that can be measured by the sensor 108, 109, and wherein the plurality of locations correspond to locations of the plurality of patches. FIG. 5A depicts an imaginary grid overlaying the image 502, where the grid is represented by dashed lines. The grid divides the image 502 into a plurality of patches 504a-f. In the example of FIG. 5A, the image is divided into 6 patches, however it will be appreciated that the image may be divided into any number of patches. Each patch may be associated with a location on the substrate and so the plurality of locations on the substrate correspond to the locations of the plurality of patches. The plurality of locations may be defined as any location within each patch, for example the midpoint of each patch. In one example, each patch has dimensions corresponding to an area on the substrate that can be measured by the sensor 108, 109. For example, the dimensions of the area may correspond to the field of view 119 of the sensor 108, 109. In one example, the patch area may be the smallest area measurable by the sensor 108, 109 and may therefore be based on the resolution of the sensor 108, 109. As already mentioned, if the image was divided into patches significantly smaller than an area resolvable by the sensor 108, 109, the sensor 108, 109 may not be able to measure an accurate color value for the colors found within the patch.

Continuing with method 600, at block 604, patch image data is determined for each patch associated with each location. The patch image data corresponds to the image data within the patch.

At block 606, the patch data is analysed for each location to determine whether the patch data corresponds to one color, or two or more colors. If every patch within the image relates to a single color, the image itself can be printed in block 402 because the sensor 108, 109 would measure a single color in its field of view 119 at each location. As can be seen in FIG. 5A, at least one patch is associated with two or more colors, hence the image itself could not be printed and an abstracted image should be printed instead. An abstracted "test image" of image 502 will therefore be created and be printed as part of block 402.

To create the abstracted "test image", a single color may be assigned or associated with each patch. The abstracted image, once printed, will therefore comprise a single color in the field of view of the sensor 108, 109 at each location. Block 610 therefore describes determining a target color value for each location, patch, region or area, when the patch image data corresponds to two or more colors. In block 608, the patch image data for a location corresponds to a single color, hence the target color value for that location would be set as the target color of that single color. For example, for patches 504a and 504c, it would be determined in block 606 that the patch image data corresponds to a single color, and so the target color value for that location may be set as the target color value of that single color in block 608.

For patches 504b, 504d, 504d and 504f, it would be determined in block 606 that the patch image data corresponds to two colors, however it will be appreciated that the patch image data may correspond to two or more colors in some examples. Accordingly, should the sensor 108, 109 measure the actual color value of the patch, it would measure a combination of the two colors. To avoid this, the patch should be printed to comprise just one target color value. When the patch corresponds to two colors, the target color value for the patch could be set as either of the two colors. Thus, in block 610, the target color value for the location needs to be determined. This may be determined arbitrarily, in some examples. However, in other examples, one or more of the following procedures may be used:

According to a first procedure, each color occupies an area within the patch, and the target color value for the patch may be determined as one of the two or more colors based on the areas. For example, the target color value for the patch may be determined as the color with the largest determined area. If this first procedure is applied to patch 504d, the "black" color has a larger area than the "white" color, and the target color value may be determined as the "black" color value because it occupies a larger area within the patch than the "white" color.

According to a second procedure, each of the colors may be associated with a priority, and the target color value for the patch may be determined as one of the two or more colors based on the priorities. For example, the target color value for the patch may be determined as the color with the highest determined priority. The priorities may be determined based on a priority list, for example. If this second procedure is applied to patch 504b, the "white" color may have a higher priority than the "black" color, for example. The target color value may thus be determined as the "white" color value.

According to a third procedure, each color occupies a total combined area within the whole image, and the target color value for the patch may be determined as one of the two or more colors based on the areas. For example, the target color value for the patch may be determined as the color with the smallest determined area. In one example, the areas occupied by each color within the image may be representative of an abundance of that color, such that the target color value for the patch is determined as the least abundant color. If this third procedure is applied to patch 504e, it will be determined that the "white" color is less abundant that the "black" color across the whole image because the total area of the "white" color is less than the total area occupied by the "black" color. As the "white" color is less abundant, the target color value for the patch is determined as the "white" color value.

According to a fourth procedure, rather than selecting one of the two target colors as the target color of the patch, a first abstracted "test image" can be created in which the patch has a target color value of one of the two colors, and a second abstracted "test image" can be created in which the same patch has a target color value of the other of the two colors. Accordingly, each abstracted test image can be measured by the sensor and adjusted respective output settings can be determined for each test image. In other words, when it is determined that a location of the plurality of locations (or a patch of the plurality of patches) is associated with two or more different colors, the output settings calibration procedure can be repeated for each of the two or more different colors. If this fourth procedure is applied to patch 504f, two abstracted images may be produced, one being that depicted in FIG. 5B, and the other being identical to FIG. 5B, except the target color of the patch 504f would be "black". Hence, the method 400 may further comprise determining that a location of the plurality of locations is associated with two or more different colors; and repeating the output settings calibration procedure for each of the two or more different colors.

Figure 5B:
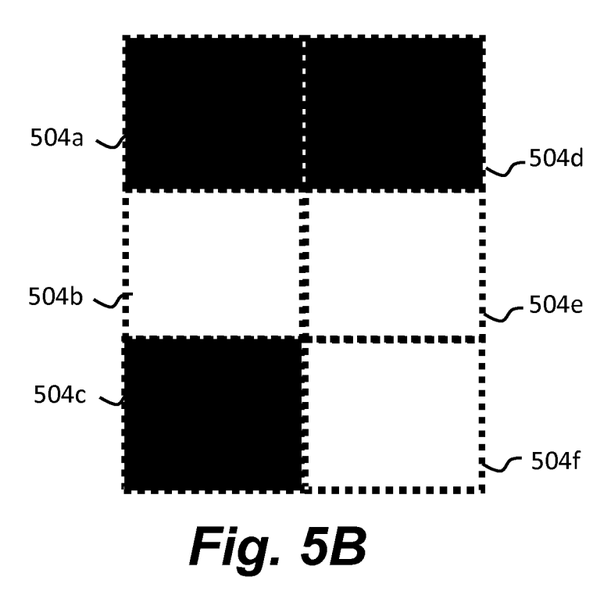
FIG. 5B is a diagram showing an abstracted version of the example image in accordance with an example.

FIG. 5B therefore depicts an abstracted "test image" to be printed once the target color values have been determined for each location according to at least one of the above procedures. The abstracted test image in FIG. 5B is an abstracted version of image 502. In this example, the target colors are shown covering the whole area of the patch, however in some examples, a portion of the patch may be printed with the target color.

In an example where the target colour is printed across the whole patch area, the sensor 108, 109 would measure actual colour values associated with that colour only. In examples where a portion of the patch area comprises single target colour once printed, the sensor 108, 109 may measure a combination of the target colour and the colour of the substrate, for example, which may skew the measurement data. To counteract this, the sensor 108, 109 may be configured to ignore the substrate area that is blank, or this may be compensated for during post processing.

Although the first, second, third, and fourth procedures have been described with reference to two colours, it will be appreciated that the procedures may also apply to any image comprising two or more colours. For example, if a patch comprises more than two colours, then the fourth procedure may produce a number of abstracted test images that corresponds to the number of colours in the patch. In one example, the number of abstracted images produced according to the fourth procedure corresponds to the number of colours in the patch which comprises the greatest number of colours. In some examples, the procedures may be applied to a subset of colours in the image. For example, the output settings calibration procedure may be performed for specific spot colours.

Once the abstracted "test image" has been created, it can be printed onto the first substrate 110. To print the correct colors, the target color values associated with each location (and therefore each patch) are translated into appropriate output settings, in block 612. Hence output settings are determined for each of the plurality of locations based on the determined target color value for each of the plurality of locations. For example, if the target color values are defined in the Lab color space, a database may store a translation between the target color values and output settings for one or more printing elements. Alternatively, a color model can be used to determine the output settings. The test image can then be printed in block 402 before being measured by the sensor 108, 109 in block 404.

Accordingly, block 402 of method 400 may comprise receiving image data indicative of an image to be printed; dividing the image data into a plurality of patches, wherein each of the plurality of patches has dimensions corresponding to an area on the first substrate 110 that can be measured by the sensor 108, 109, and wherein the plurality of locations correspond to locations of the plurality of patches; determining the target color value for each of the plurality of locations based on the image data; and determining the respective output settings for each of the plurality of locations based on the determined target color value for each of the plurality of locations.

Determining the target color value for a location of the plurality of locations may comprise: determining patch image data for a patch associated with the location; and determining that the patch image data corresponds to two or more colors. The method may further comprise at least one of: determining an area within the patch occupied by each of the two or more colors and determining the target color value for the location as one of the two or more colors based on the determined areas; determining a priority for each of the two or more colors and determining the target color value for the location as one of the two or more colors based on the priorities; and determining an area within the image occupied by each of the two or more colors and determining the target color value for the location as one of the two or more colors based on the determined areas.

Figure 7A:
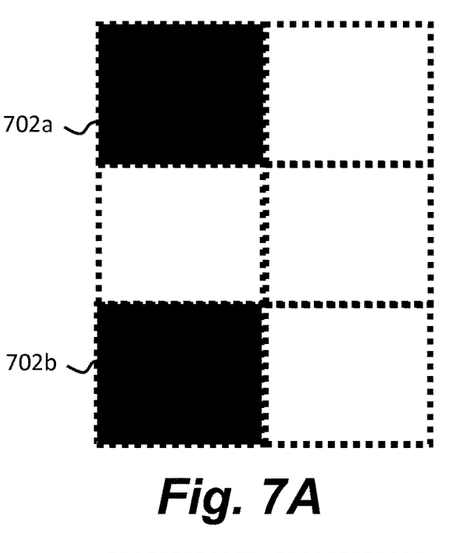
FIG. 7A is a diagram showing a second example image to be printed onto a substrate in accordance with an example.
Figure 7B:
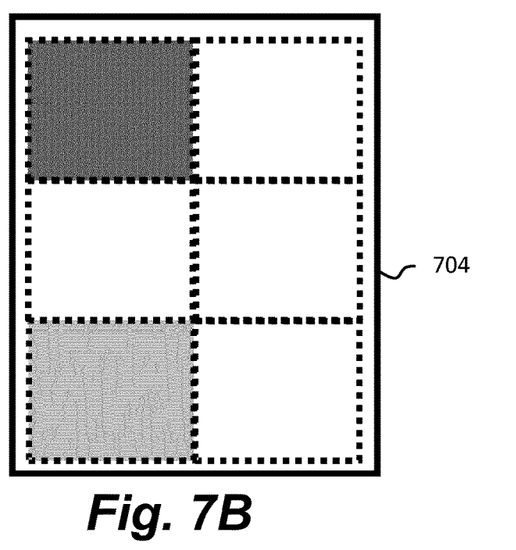
FIG. 7B is a diagram showing the second example image once printed onto the substrate in accordance with an example.
Figure 7C:
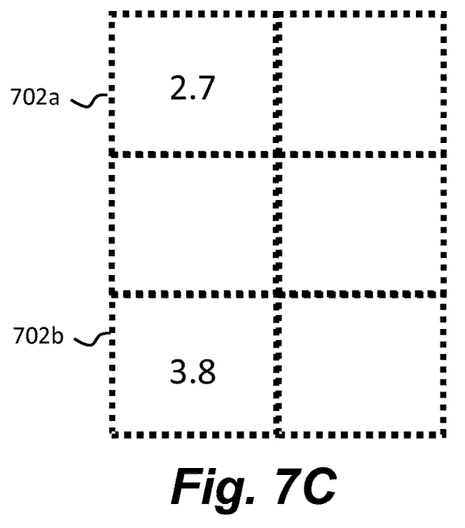
FIG. 7C is a diagram showing the differences between the actual color value and the target color value for the second example image, in accordance with an example.
Figure 7D:
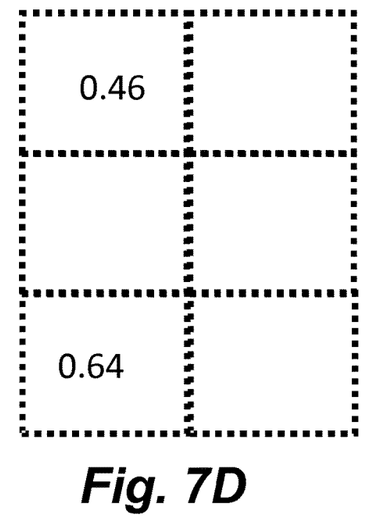
FIG. 7D is a diagram showing the differences between the actual color value and the target color value for the second example image, once respective output settings have been adjusted, in accordance with an example.

As mentioned, in block 404, the sensor 108, 109 can measure an actual color value of the ink deposited onto the first substrate 110 at each of the plurality of locations. In other words, the sensor 108, 109 can measure an actual color value of the ink deposited onto the first substrate 110 in each of the plurality of patches. This actual color value is then compared to the target color value for each of the plurality of locations in block 406. FIG. 7A depicts an image to be printed onto the first substrate 110. In this example, the image is an abstracted "test image" comprising a single color in patches 702a and 702b. The remaining patches are blank. FIG. 7B depicts the abstracted test image once printed onto the substrate 704. As can be seen, even though the same target color value was to be printed in the different locations, the colors actually appear as two different colors, neither of which correspond to the target color value. The sensor 108, 109 can then measure an actual color value of the ink deposited onto the substrate 504 at each of the locations. FIG. 7C illustrates a difference between the actual color value and the target color value for each of the locations, which may be calculated in block 406. In this example, for patch 702a, the difference is expressed as in terms of dE, where dE=2.7. For patch 702b, the difference, dE=3.8. Based on these determined differences, adjusted respective output settings for each of the plurality of locations can be determined in block 408. For example, it is apparent that the adjustment to be made for patch 702a will be different to the adjustment to be made for patch 702b. Hence, the adjustments are location dependent. Once adjustments to the respective output settings have been made, the image can be reprinted to determine how effective the adjustments were. FIG. 7D illustrates a difference between the actual color value and the target color value for each of the locations once the adjusted respective output settings have been applied. It can be seen that the differences dE for both patches 702a and 702b have been reduced. In this example, the differences are so small that the printed image would appear to correspond to the image shown in FIG. 7A.

An example method of determining adjusted respective output settings will now be described. In one example, block 408 may comprise determining adjusted respective output settings using a color model. A color model can be used to translate from output settings to a color space, for example. In one example, a color model maps or transforms color values (for example CMYK values) to a colour space (for example L*a*b* values). So in this example, the CMYK values are used to determine the expected reflectance that would be measured by a colour sensor, such as a spectrophotometer, and may be represented by the following:

$$f(C, M, Y, K) = (L^*, a^*, b^*) \quad (2)$$

An example color model is the Yule-Nielsen model:

$$f(C, M, Y, K) = (\Sigma a_i(C, M, Y, K) R_i^n(\lambda))^{1/n} \quad (3)$$

$a_i$ denotes surface coverages of the CMYK colors. For example, as coloured inks are printed onto a substrate, the surface of the substrate will be covered by ink dots, some of which may overlap. For example, there will be areas with no ink, those with a single ink layer, and those with two, three or more superposed ink layers. These different colored areas are known as Neugebauer primaries. In CMYK printing, comprising four inks, there are sixteen Neugebauer primaries corresponding to the different combinations of ink. Different numbers of inks will therefore have a different number of Neugebauer primaries, for example in CMY prints, comprising three inks, there are eight different combinations. In an example using four inks, C, M, Y and K, the sixteen combinations are expressed in equation (4) below:

$a_0 = (1-c)(1-m)(1-y)(1-k)$ $a_1 = c(1-m)(1-y)(1-k)$ $a_2 = m(1-c)(1-y)(1-k)$ $a_3 = y(1-c)(1-m)(1-k)$ $a_4 = k(1-c)(1-m)(1-y)$ $a_5 = cm(1-y)(1-k)$ $a_6 = cy(1-m)(1-k)$ $a_7 = ck(1-m)(1-y)$ $a_8 = my(1-c)(1-k)$ $a_9 = mk(1-c)(1-y)$ $a_{10} = yk(1-c)(1-m)$ $a_{11} = cmy(1-k)$ $a_{12} = cmk(1-y)$ $a_{13} = cyk(1-m)$ $a_{14} = myk(1-c)$ $a_{15} = cmyk \quad (4)$ Furthermore, in equation 3, $\lambda$ denotes wavelength; n is the n factor which is an index of the amount of optical dot gain; and $R_i$ denotes the reflectance value that corresponds to the $a_i$ surface coverage value. In one example, the n factor can be found numerically using measured data and may be approximately 2, however other n factor values may be used.

A color model can thus can represent a color space of a printer system by predicting every color value available to the printer system according to all available CMYK values. As already mentioned, the sensor 108, 109 can be used to measure actual color values for each location on the substrate. These actual color values can be represented as L*a*b* values, for example. Inputting the actual color values $(L^*_0 a^*_0 b^*_0)$ into the inverse of the color model in equation (3) above for each location, allows actual output settings $(C_0, M_0, Y_0, K_0)$ to be determined. These actual output settings describe "modelled" output settings $CMYK_{actual}^{modelled} = C_0, M_0, Y_0, K_0$, that correspond to the actual color values printed onto the substrate at each of the locations.

Similarly, target output settings $(C_0+\Delta C, M_0+\Delta M, Y_0+\Delta Y, K_0+\Delta K)$ can be determined by inputting the target color values $(L^*_0+\Delta L, a^*_0+\Delta a, b^*_0+\Delta b)$ into the inverse color model for each location. These target output settings describe "modelled" output settings $CMYK_{target}^{modelled} = C_0+\Delta C, M_0+\Delta M, Y_0+\Delta Y, K_0+\Delta K$, that should, ideally, achieve the target color values. These target output settings may already have been calculated in block 402 and/or block 612, for example.

Next, a difference, $\Delta = \Delta C, \Delta M, \Delta Y, \Delta K$, between the target output settings and the actual output settings can be determined:

$$\Delta = CMYK_{actual}^{modelled} - CMYK_{target}^{modelled} \quad (5)$$

This assumes that the model is the ground truth in the linear approximation:

$$f(C_0 + \Delta C, M_0 + \Delta M, Y_0 + \Delta Y, K_0 + \Delta K) = \quad (6)$$
$$f(C_0, M_0, Y_0, K_0) + \frac{\partial f}{\partial C}\Delta C + \frac{\partial f}{\partial M}\Delta M + \frac{\partial f}{\partial Y}\Delta Y +$$
$$\frac{\partial f}{\partial K}\Delta K + O(\Delta^2) = (L^*_0 + \Delta L, a^*_0 + \Delta a, b^*_0 + \Delta b)$$

This difference, $\Delta$, represents adjustments that should be made to the current output settings for a particular location. The next, adjusted output settings, $CMYK_{next}$, can therefore be determined by adjusting the current output settings, $CMYK_{current}^{printed}$, by this difference:

$$CMYK_{next}=CMYK_{current}^{printed}+\Delta \quad (7)$$

The current output settings correspond to the output settings that were used to print the image that was measured by the sensor. The adjusted output settings should therefore result in actual color values being printed onto the second substrate 112 that more closely correspond to the target color values for each of the plurality of locations. Accordingly, block 408 may comprise, for each of the plurality of locations: determining actual output settings using the actual color value and a color model which maps color values to output settings; determining target output settings using the target color value and the color model; determining a difference between the target output settings and the actual output settings; and determining the adjusted output settings based on the determined difference.

Figure 8:
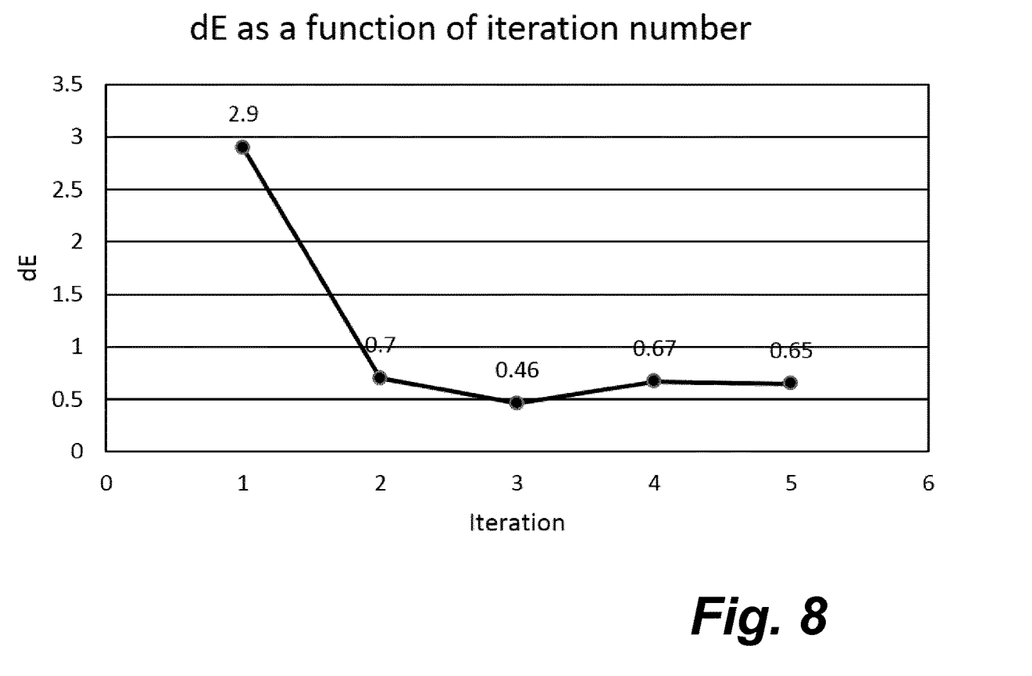
FIG. 8 is a graph showing the color difference as a function of iteration number.

If the actual color values on the second substrate 112 are measured again, and the color difference dE is below a threshold for at least one of the plurality of locations, no further adjustments to the output settings may be needed. However, if the color difference dE is still above the threshold, further adjustments may be made by repeating the procedure described above. Hence, in some examples, the method 400 may be repeated or iterated more than once. FIG. 8 depicts a graph showing dE plotted against the iteration number. It can be seen that one iteration reduces dE significantly, using a color model as discussed above.

As will be appreciated, the above procedure is independent of the color model used. A color model can be selected depending upon the printing technology being used and/or the sensor technology being used to measure the printed image.

Once blocks 402-408 have been completed, the adjusted output settings can be stored in the memory 104, 105 for later use. These can be stored in a location based look up table (LUT), for example. An example LUT may store a single coverage value (output setting) for a specified color value at each location on the substrate, and the coordinates of each location. Such a LUT could be constructed for each color separation separately, such that a LUT exists for each of the one or more printing elements. In other examples, a single LUT may exist, and may be an array of multiple dimensions, where each dimension relates to each printing element.

In another example, a LUT may be constructed for each target colour value. Such a LUT may have dimensions reflective of the grid that divided the image data into a plurality of patches. Entries within the table may comprise adjusted output settings for all of the printing elements, if they have been calibrated for that location.

In some examples, the LUT may be specific to each image being printed. However, in other examples the LUT may be compiled over time as different target colours are corrected at different locations, such that the LUT can be used as a library for different images being printed.

In locations on the substrate where no colors are printed, the LUT should have no effect on the output settings. In some cases, target colors in some locations may not have an associated adjustment due to the fact that the particular target color found at that location was not printed or measured during the creation of the abstracted "test image", as described above. Accordingly, the closest neighbour may be estimated for that color. In case of several closest neighbours, an average, such as the arithmetic mean, can be used.

Certain system components and methods described herein may be implemented by way of non-transitory computer program code that is storable on a non-transitory storage medium. In some examples, the controller 102, 103 may comprise a non-transitory computer readable storage medium comprising a set of computer-readable instructions stored thereon. The controller 102, 103 may further comprise one or more processors. In some examples, control may be split or distributed between two or more controllers 102, 103 which implement all or parts of the methods described herein.

Figure 9:
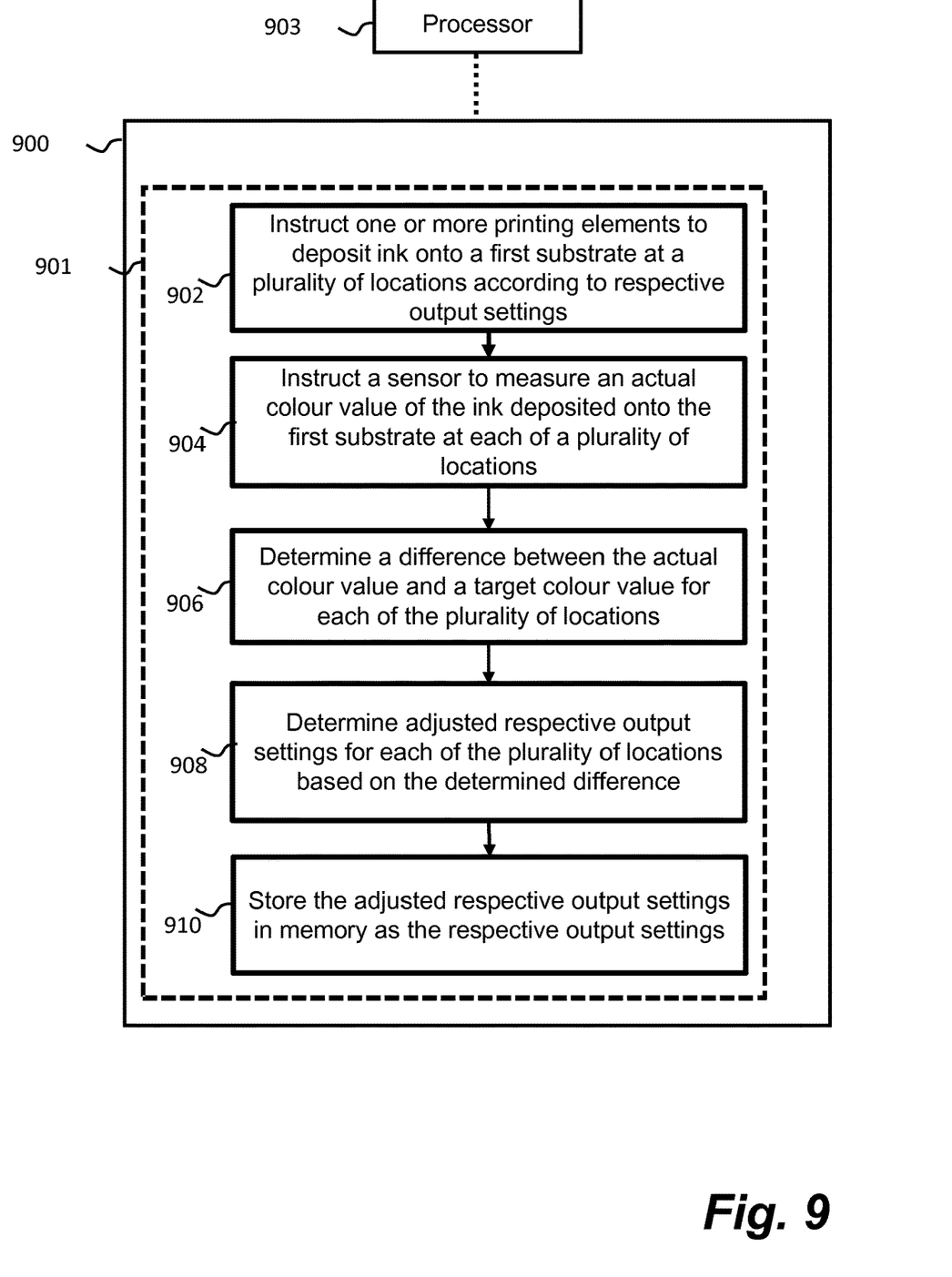
FIG. 9 is a diagrammatic representation of an example set of computer-readable instructions within a non-transitory computer-readable storage medium.

FIG. 9 shows an example of such a non-transitory computer-readable storage medium 900 comprising a set of computer readable instructions 901 which, when executed by at least one processor 903, cause the processor(s) 903 to perform a method according to examples described herein. The computer readable instructions 901 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 901 cause the processor 903 in a printer system 100, 101 to, at block 902, instruct one or more printing elements to deposit ink onto a first substrate at a plurality of locations according to respective output settings. At block 904, the instructions 901 cause the processor 903 to instruct a sensor to measure an actual color value of the ink deposited onto the first substrate at each of a plurality of locations. At block 906, the instructions 901 cause the processor 903 to determine a difference between the actual color value and a target color value for each of the plurality of locations. At block 908, the instructions 901 cause the processor 903 to determine adjusted respective output settings for each of the plurality of locations based on the determined difference. At block 910, the instructions 901 cause the processor 903 to and store the adjusted respective output settings in memory as the respective output settings.

What is claimed is:

1. A printer system comprising:
 a controller;
 a non-transitory memory to store respective output settings for a plurality of locations on a substrate;
 one or more printing elements to deposit ink onto the substrate, wherein the one or more printing elements deposit a corresponding color of ink; and
 a sensor to measure actual color values of the ink deposited onto the substrate;
 wherein the controller is to:
 instruct the one or more printing elements to deposit ink onto the substrate according to the respective output settings, wherein the respective output settings define ink coverage values for the one or more printing elements;
 instruct the sensor to measure the actual color values of the ink deposited onto the substrate at each of a plurality of locations;
 determine a difference between the actual color values and a target color value for each of the plurality of locations to generate a difference value at each of the plurality of locations;

determine adjusted respective output settings for each of the plurality of locations based on the difference value at each of the plurality of locations, wherein the adjusted respective output settings define adjusted ink coverage values for the one or more printing elements for each of the plurality of locations; and store the adjusted respective output settings in the memory as the updated respective output settings for each corresponding color of ink at each of the plurality of locations.

2. The printer system of claim 1, wherein the controller is further to:

instruct the one or more printing elements to deposit ink onto a second substrate at the plurality of locations according to the adjusted respective output settings.

3. The printer system of claim 1, wherein to instruct the one or more printing elements to deposit ink onto a first substrate according to the respective output settings, the controller is to:

receive image data indicative of an image to be printed;
select the plurality of locations based on a resolution of the sensor;
determine the target color value for each of the plurality of locations based on the image data; and
determine the adjusted respective output settings for each of the plurality of locations based on the determined target color value for each of the plurality of locations.

4. The printer system of claim 3, wherein to select the plurality of locations based on a resolution of the sensor, the controller is to:

divide the image data into a plurality of patches, wherein each of the plurality of patches has dimensions corresponding to an area on the first substrate that can be measured by the sensor, and wherein the plurality of locations correspond to locations of the plurality of patches.

5. The printer system of claim 4, wherein to determine the target color value for a location of the plurality of locations, the controller is to:

determine patch image data for a patch associated with the location;
determine that the patch image data corresponds to two or more colors;
determine an area within the patch occupied by each of the two or more colors; and
determine the target color value for the location as one of the two or more colors based on the determined areas.

6. The printer system of claim 4, wherein to determine the target color value for a location of the plurality of locations, the controller is to:

determine patch image data for a patch associated with the location;
determine that the patch image data corresponds to two or more colors;
determine a priority for each of the two or more colors;
determine the target color value for the location as one of the two or more colors based on the priorities.

7. The printer system of claim 4, wherein to determine the target color value for a location of the plurality of locations, the controller is to:

determine patch image data for a patch associated with the location;
determine that the patch image data corresponds to two or more colors;
determine an area within the image occupied by each of the two or more colors;
determine the target color value for the location as one of the two or more colors based on the determined areas.

8. The printer system of claim 1, wherein to determine adjusted respective output settings, the controller is to, for each of the plurality of locations:

determine actual output settings using the actual color value and a color model which maps color values to output settings;
determine target output settings using the target color value and the color model;
determine a difference between the target output settings and the actual output settings; and
determine the adjusted output settings based on the determined difference.

9. A method of printing comprising:

executing an output settings calibration procedure, the procedure comprising:

depositing, by one or more printing elements, ink onto a first substrate according to respective output settings, wherein the one or more printing elements deposit a corresponding color of ink and the respective output settings define ink coverage values for the one or more printing elements;
measuring, by a sensor, an actual color value of the ink deposited onto the first substrate at each of a plurality of locations;
determining a difference between the actual color value and a target color value for each of the plurality of locations to generate a difference value at each of the plurality of locations; and
determining adjusted respective output settings for each of the plurality of locations based on the determined difference value at each of the plurality of locations; and
depositing, by the one or more printing elements, ink onto a second substrate according to the adjusted respective output settings, wherein the adjusted respective output settings define adjusted ink coverage values for the one or more printing elements for each of the plurality of locations.

10. The method of claim 9, further comprising:

determining that a location of the plurality of locations is associated with two or more different colors; and
repeating the output settings calibration procedure for each of the two or more different colors.

11. The method of claim 9, wherein depositing, by one or more printing elements, ink onto a first substrate according to respective output settings comprises:

receiving image data indicative of an image to be printed;
dividing the image data into a plurality of patches, wherein each of the plurality of patches has dimensions corresponding to an area on the first substrate that can be measured by the sensor, and wherein the plurality of locations correspond to locations of the plurality of patches;
determining the target color value for each of the plurality of locations based on the image data; and
determining the respective output settings for each of the plurality of locations based on the determined target color value for each of the plurality of locations.

12. The method of claim 11, wherein determining the target color value for a location of the plurality of locations comprises:

determining patch image data for a patch associated with the location;
determining that the patch image data corresponds to two or more colors; and the method further comprises at least one of:

determining an area within the patch occupied by each of the two or more colors and determining the target color value for the location as one of the two or more colors based on the determined areas;

determining a priority for each of the two or more colors and determining the target color value for the location as one of the two or more colors based on the priorities; and determining an area within the image occupied by each of the two or more colors and determining the target color value for the location as one of the two or more colors based on the determined areas.

13. The method of claim 9, wherein determining adjusted respective output settings for each of the plurality of locations based on the determined difference, comprises, for each of the plurality of locations:

determining actual output settings using the actual color value and a color model which maps color values to output settings;

determining target output settings using the target color value and the color model;

determining a difference between the target output settings and the actual output settings; and determining the adjusted respective output settings based on the determined difference.

14. The method of claim 9, further comprising:

repeating the output settings calibration procedure until the determined difference for at least one of the plurality of locations is below a threshold difference.

15. A non-transitory computer-readable storage medium storing instructions that, when executed by one or more processors, cause the one or more processors, in a printer system, to:

instruct one or more printing elements to deposit ink onto a first substrate at a plurality of locations according to respective output settings, wherein the one or more printing elements deposit a corresponding color of ink and the respective output settings define ink coverage values for the one or more printing elements;

instruct a sensor to measure an actual color value of the ink deposited onto the first substrate at each of a plurality of locations;

determine a difference between the actual color value and a target color value for each of the plurality of locations to generate a difference value at each of the plurality of locations;

determine adjusted respective output settings for each of the plurality of locations based on the determined difference value at each of the plurality of locations; and store the adjusted respective output settings in memory as the respective output settings, wherein the adjusted respective output settings define adjusted ink coverage values for the one or more printing elements for each of the plurality of locations.

* * * * *